(12) United States Patent
Bamba

(10) Patent No.: US 9,727,202 B2
(45) Date of Patent: Aug. 8, 2017

(54) VESSEL DISPLAY DEVICE AND VESSEL INFORMATION DISPLAY METHOD

(71) Applicant: YAMAHA HATSUDOKI KABUSHIKI KAISHA, Iwata-shi, Shizuoka (JP)

(72) Inventor: Takaaki Bamba, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/083,542

(22) Filed: Mar. 29, 2016

(65) Prior Publication Data

US 2016/0311510 A1 Oct. 27, 2016

(30) Foreign Application Priority Data

Apr. 21, 2015 (JP) ................................ 2015-086927

(51) Int. Cl.
| | |
|---|---|
| *B63B 45/00* | (2006.01) |
| *G06F 3/0481* | (2013.01) |
| *B63H 25/02* | (2006.01) |
| *B63B 49/00* | (2006.01) |
| *B63J 99/00* | (2009.01) |

(52) U.S. Cl.
CPC ............ *G06F 3/0481* (2013.01); *B63B 49/00* (2013.01); *B63H 25/02* (2013.01); *B63J 2099/008* (2013.01)

(58) Field of Classification Search
CPC ......... B63B 45/00; B63B 49/00; B63K 37/02; B63K 2350/1072; G06F 3/00; B63J 2099/008

USPC ................................. 340/945, 946, 908, 984
See application file for complete search history.

(56) References Cited

U.S. PATENT DOCUMENTS

| | | | |
|---|---|---|---|
| 6,259,981 B1 | 7/2001 | Wilcosky | |
| 6,952,630 B2 * | 10/2005 | Hedrick | G01C 23/005 340/461 |
| 7,143,363 B1 * | 11/2006 | Gaynor | B63J 99/00 340/461 |
| 2008/0258892 A1 * | 10/2008 | Itoh | B60K 37/02 340/441 |
| 2009/0271151 A1 * | 10/2009 | O'Neal | H03M 7/30 702/182 |
| 2016/0160779 A1 * | 6/2016 | Yeager | F02D 41/009 701/103 |

* cited by examiner

*Primary Examiner* — Hung T Nguyen
(74) *Attorney, Agent, or Firm* — Keating and Bennett, LLP

(57) ABSTRACT

A vessel display device displays information on a vessel. The vessel display device includes an information acquirer that acquires the same type of information on a plurality of propulsion machines included in the vessel, a display information generator that generates, based on the information acquired by the information acquirer, display information which displays information on the plurality of propulsion machines on a single scale, and a display that displays the display information generated by the display information generator. The display information generator may generate display information which displays the same type of information on the plurality of propulsion machines in a different format on a single scale. The display information generator may generate display information which sequentially displays the same type of information on the plurality of propulsion machines on a single scale.

16 Claims, 10 Drawing Sheets

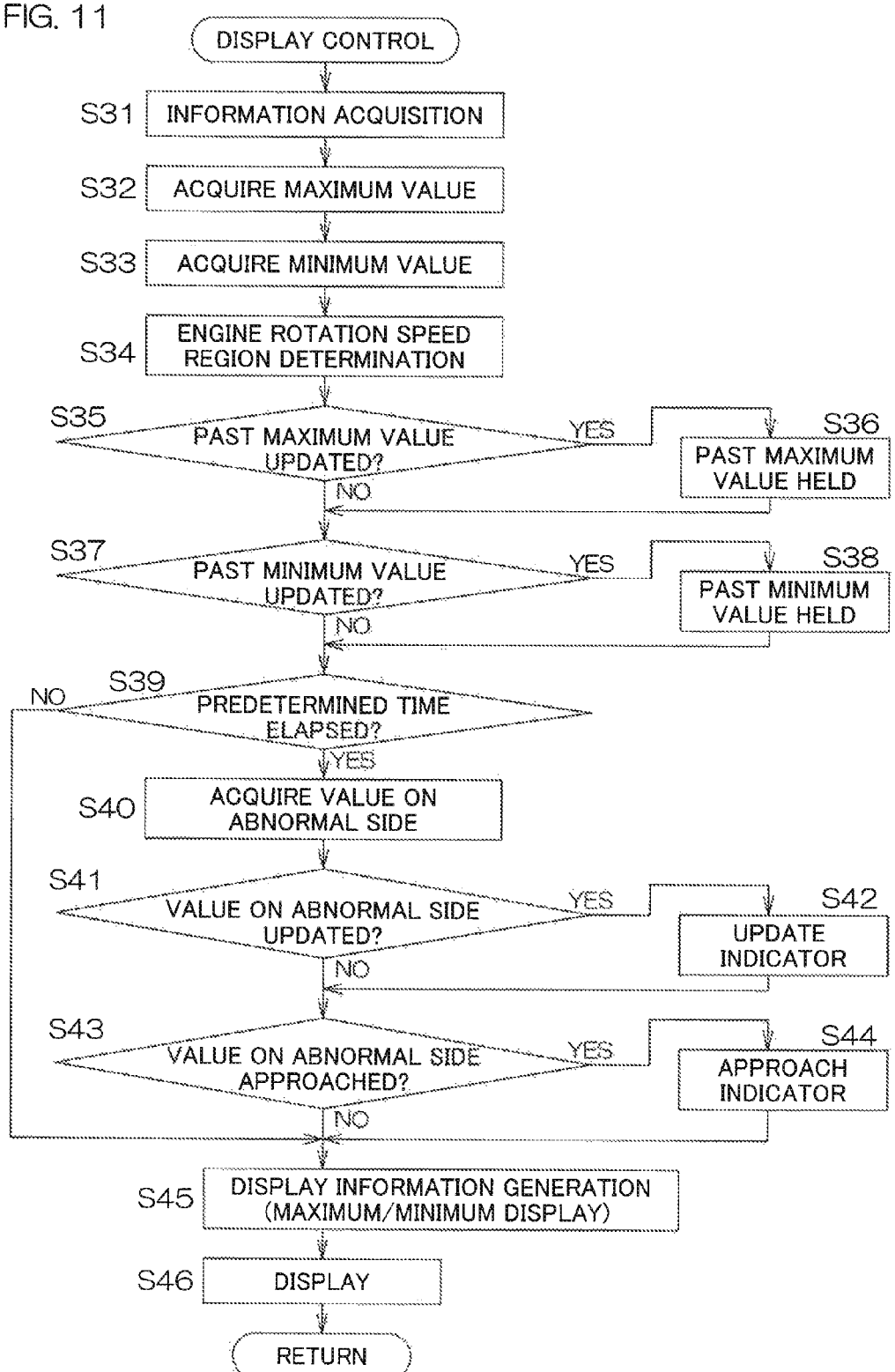

VESSEL DISPLAY DEVICE AND VESSEL INFORMATION DISPLAY METHOD

BACKGROUND OF THE INVENTION

1. Field of the Invention

The present invention relates to a vessel display device that displays information on a plurality of propulsion machines and a vessel information display method.

2. Description of the Related Art

In a vessel including a propulsion machine, a vessel display device that displays information on the propulsion machine may be provided on a maneuvering seat. An example of such a vessel display device is disclosed in U.S. Pat. No. 6,259,981.

U.S. Pat. No. 6,259,981 discloses an operator interface display screen. The display screen displays various types of information on two propulsion machines (marine engines). Specifically, with respect to each of the two propulsion machines, an engine rotation speed, a coolant temperature, an engine oil pressure, a transmission oil temperature, and a transmission oil pressure are displayed both in an analog format and in a digital format.

SUMMARY OF THE INVENTION

The inventor of preferred embodiments of the present invention described and claimed in the present application conducted an extensive study and research regarding a vessel display device, such as the one described above, and in doing so, discovered and first recognized new unique challenges and previously unrecognized possibilities for improvements as described in greater detail below.

In the related art described above, a plurality of items of information on each of the plurality of propulsion machines are individually displayed. Hence, when a large number of propulsion machines are included in a vessel, a display region is insufficient. Therefore, since the number of display items needs to be reduced, the amount of information that can be provided is decreased.

This problem is somewhat alleviated if a user is able to choose the display items. However, the operation burden on the user is increased. Moreover, since it is necessary to design an interface for choosing the display items, the development burden is significant.

Furthermore, since the amount of information that needs to be displayed greatly differs depending on the number of propulsion machines, it is necessary to individually produce a basic screen design according to the number of propulsion machines.

When a large number of propulsion machines are provided, since the amount of information which needs to be recognized and on which a necessary determination needs to be made by the user is increased, the burden on the user is increased.

In order to overcome the previously unrecognized and unsolved challenges described above, a preferred embodiment of the present invention provides a vessel display device that displays information on a vessel. The vessel display device includes an information acquirer that acquires the same type of information on a plurality of propulsion machines included in the vessel, a display information generator that generates, based on the information acquired by the information acquirer, display information which displays information on the plurality of propulsion machines on a single scale, and a display that displays the display information generated by the display information generator.

In this arrangement, the same type of information on a plurality of propulsion machines included in the vessel is displayed on a single scale. Hence, since the same type of information on a plurality of propulsion machines is displayed in a small display region, the display region is effectively utilized. Specifically, information on a larger number of items is simultaneously displayed in the display region. Hence, it is not always necessary for the user to choose the display items. The vessel display device does not need to include a mechanism to choose the display items. Thus, it is possible to reduce the burden on the user and to reduce the burden on the development and design of the vessel display device.

Since the same types of information on a plurality of propulsion machines are integrally displayed on the single scale, it is possible to efficiently develop and design the screen design corresponding to the number of propulsion machines and to reduce the burden thereof.

Moreover, since the same types of information on a plurality of propulsion machines are integrally displayed on the single scale, the user is able to easily recognize the information on a plurality of propulsion machines. In this way, the user is able to easily make a determination based on the displayed information. Thus, it is possible to reduce the burden of recognition of information and determination on the user and to provide a user-friendly vessel display device.

In a preferred embodiment of the present invention, the display information generator generates display information which displays the same type of information on the plurality of propulsion machines in a different format on the single scale. In this arrangement, it is possible to display in a distinguishable format the information on the plurality of propulsion machines within a small display region.

One example of the "different format" is a display format in which one or more of the character, the figure (shape), the position, the color, and the size thereof are different. For example, a character that identifies the propulsion machine is attached to the indicator, the indicator having a different shape or color is used or the position of the indicator is different, and thus the information on the plurality of propulsion machines is displayed in a distinguishable format on the single scale.

In a preferred embodiment of the present invention, the display information generator generates display information which sequentially displays the same type of information on the plurality of propulsion machines on the single scale. The term "sequentially display" means that a display is switched and produced at intervals of a predetermined time.

In this arrangement, since the information on the plurality of propulsion machines is sequentially switched and displayed on the single scale, within a small display region, the information on the plurality of propulsion machines is displayed in a distinguishable format with satisfactory visibility.

In a preferred embodiment of the present invention, the vessel display device further includes an abnormality detector that determines whether or not an abnormality occurs in any of the plurality of propulsion machines. In a case where the information on the plurality of propulsion machines is sequentially switched and displayed, when the abnormality detector determines that an abnormality occurs in any propulsion machine, the display information generator generates display information which fixedly displays information on the propulsion machine having the abnormality. Thus, the switching of the display is stopped, and the information on the propulsion machine having the abnormality is continuously displayed. In this way, it is possible to provide the information to which the user most needs to give attention.

In a preferred embodiment of the present invention, the display information generator generates display information which displays, on the scale, a range display indicating a range between a maximum value and a minimum value of the same type of information on the plurality of propulsion machines. In this arrangement, the range including the same type of information on the plurality of propulsion machines is displayed on the scale. In this way, the user is able to recognize at once the information on the plurality of propulsion machines. For example, the user is able to confirm that information on all the propulsion machines falls within the range of normal values and that information on at least one propulsion machine is an abnormal value.

In a preferred embodiment of the present invention, the display information generator selects information closest to an abnormal value among the same type of information on the plurality of propulsion machines and generates display information which displays the selected information on the scale. The "information closest to an abnormal value" refers to the maximum value or the minimum value among the same type of information on the plurality of propulsion machines. That is, in contrast to a case where a value is low, when the value is high an abnormality that is highly likely to occur corresponds to the maximum value. Similarly, in contrast to a case where a value is high, when the value is low an abnormality that is highly likely to occur corresponds to the minimum value.

In this arrangement, it is possible to select and display the information to which the user most needs to give attention. The information closest to an abnormal value is displayed, and thus the user is able to confirm that information on all of the propulsion machines falls within the range of normal values and that information on at least one propulsion machine is an abnormal value.

In a preferred embodiment of the present invention, the display information generator generates display information which displays, on the scale, one or both of a past maximum value and a past minimum value on the same type of information on the plurality of propulsion machines and which displays, on the scale, one or both of a current maximum value and a current minimum value on the same type of information on the plurality of propulsion machines. The "past maximum value" refers to the maximum value after the start of the recording of the maximum value. The "past minimum value" refers to the minimum value after the start of the recording of the minimum value.

In this arrangement, one or both of the past maximum value and the past minimum value on the information on the plurality of propulsion machines and one or both of the current maximum value and the current minimum value are displayed on the single scale. In this way, the user is able to compare the past maximum/minimum values and the current maximum/minimum values at a glance. Hence, the user is able to confirm whether or not an abnormality occurs or an indication thereof.

When any of the maximum value and the minimum value is displayed, the value on the abnormal side is preferably displayed according to the type of displayed information.

In a preferred embodiment of the present invention, when the display information generator updates a past value of one or both of the maximum value and the minimum value on the same type of information on the plurality of propulsion machines, the display information generator generates display information including an update display which notifies the update. The "past value" refers to the maximum value/the minimum value after the start of the recording of the maximum value/the minimum value.

In this arrangement, since the information that the maximum value/the minimum value updates the past value is notified, it is possible to make the user recognize whether or not an abnormality occurs or an indication thereof.

In a preferred embodiment of the present invention, when the past value of one or both of the maximum value and the minimum value on the same type of information on the plurality of propulsion machines is approached, the display information generator generates display information including an approach notification display which notifies the approach.

In this arrangement, since when the information on the propulsion machine approaches the past maximum value/minimum value is notified to the user, the user is able to easily know an indication of an abnormality.

For example, an indicator may be provided within the screen that produces a yellow display (approach display color) when the past maximum value/minimum value are approached, a red display (abnormal display color) when the maximum value/minimum value are updated, and a blue display (normal display color) in a case other than the above cases. Such an indicator may also serve as the indicator to display information on the scale.

In a preferred embodiment of the present invention, each of the plurality of propulsion machines includes a prime mover, the information acquirer acquires prime mover rotation speeds in the plurality of propulsion machines and the display information generator divides the prime mover rotation speeds into a plurality of rotation speed regions, records one or both of a maximum value and a minimum value on the same type of information on the plurality of propulsion machines in each of the rotation speed regions and generates display information which displays, on the scale, one or both of a past maximum value and a past minimum value in the rotation speed region to which a current prime mover rotation speed belongs.

The "prime mover" is a drive source of the propulsion machine, and preferably includes an internal combustion engine or an electric motor. The prime mover rotation speed is the rotation speed thereof. The "maximum value" and the "minimum value" are respectively the maximum value and the minimum value of the information after the start of the recording of information of the propulsion machine.

In this arrangement, in a plurality of rotation speed regions, the maximum value/the minimum value of the information of the propulsion machine are recorded, and the maximum value/the minimum value of the rotation speed region to which the current prime mover rotation speed belongs are displayed on the scale. In this way, it is possible to produce an appropriate display corresponding to the current state of the propulsion machine. Specifically, it is possible to notify, according to the rotation speed of the prime mover, the user of whether or not the information on the current propulsion machine is abnormal or whether or not an indication of an abnormality is produced.

In a preferred embodiment of the present invention, the display information generator generates display information in which past information is not reflected until a predetermined time has elapsed since startup of at least one propulsion machine.

In this arrangement, after the predetermined time has elapsed since the startup of the propulsion machine, a display on which the past information is reflected is produced. Since information acquired immediately after the startup of the propulsion machine is not necessarily stable, such information is not necessarily reliable enough to satisfy a criterion for the determination of the occurrence of an abnormality or an indication thereof. Hence, after the predetermined time has elapsed, the display on which the past information is reflected is started, and thus it is possible to provide highly reliable information to the user.

In a preferred embodiment of the present invention, the information acquirer acquires information on each of the plurality of propulsion machines including a prime mover temperature, a prime mover rotation speed, a lubricant pressure, a lubricant temperature, a coolant temperature, a coolant pressure, or a battery voltage. In this way, it is possible to provide information useful for the travel of the vessel to the user.

According to another preferred embodiment of the present invention, a method of displaying information on a vessel includes the steps of acquiring the same type of information on a plurality of propulsion machines included in the vessel, generating, based on the acquired information, display information which displays information on the plurality of propulsion machines on a single scale, and displaying the generated display information on the display.

In a preferred embodiment of the present invention, in the step of generating the display information, information closest to an abnormal value among the same type of information on the plurality of propulsion machines is selected and display information which displays the selected information on the scale is generated.

In a preferred embodiment of the present invention, in the step of generating the display information, display information which displays, on the scale, one or both of a past maximum value and a past minimum value on the same type of information on the plurality of propulsion machines and which displays, on the scale, one or both of a current maximum value and a current minimum value on the same type of information on the plurality of propulsion machines is generated.

In a preferred embodiment of the present invention, in the step of generating the display information, when a past value of one or both of a maximum value and a minimum value on the same type of information on the plurality of propulsion machines is updated, display information including an updated display which notifies the update is generated.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a flowchart for illustrating a process to generate the fourth display example.

DETAILED DESCRIPTION OF THE PREFERRED EMBODIMENTS

Figure 1:
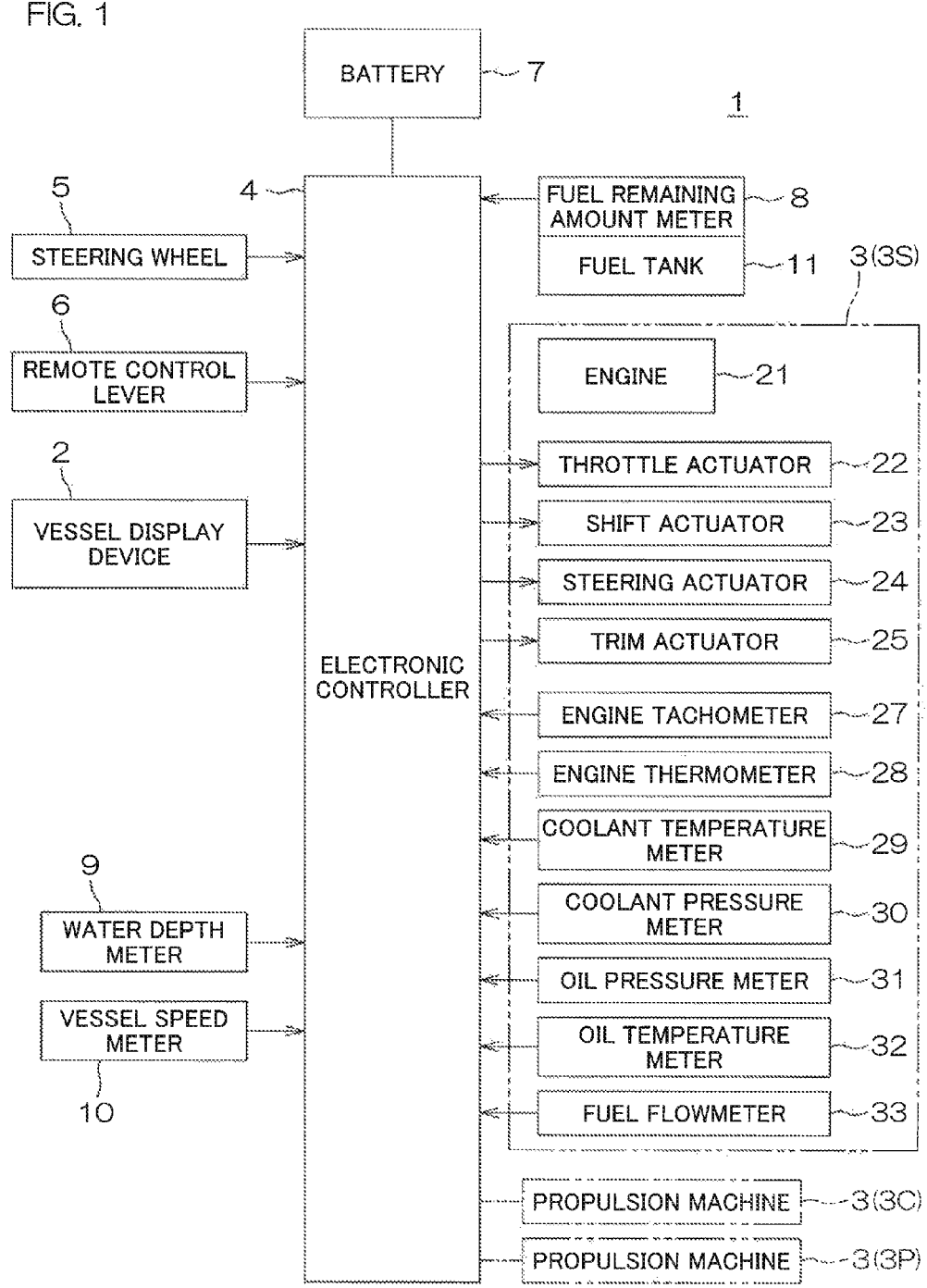
FIG. 1 is a block diagram mainly showing an electrical arrangement of a vessel including a vessel display device according to a preferred embodiment of the present invention.

FIG. 1 is a block diagram mainly showing an electrical arrangement of a vessel including a vessel display device according to a preferred embodiment of the present invention. The vessel 1 includes the vessel display device 2, a propulsion machine 3, and an electronic controller 4. The vessel display device 2 and the propulsion machine 3 are connected to the electronic controller 4. Furthermore, a steering wheel 5 serving as a steering device, a remote control lever 6 serving as an output instruction device, a battery 7, a fuel remaining amount meter 8, a water depth meter 9, and a vessel speed meter 10 are connected to the electronic controller 4.

The vessel display device 2 is provided on the console of the vessel 1, that is, a maneuvering seat. The vessel display device 2 is used as a display device that displays various types of information. In addition, the vessel display device 2 is used as an input device that inputs an operation instruction on the propulsion machine 3. Specifically, the vessel display device 2 includes a touch panel function. The steering wheel 5 is provided on the maneuvering seat, and is an operation member that is operated by a vessel operator so as to change the traveling direction of the vessel 1. The remote control lever 6 is an operation member that is operated by the vessel operator so as to switch the direction of a propulsion force produced by the propulsion machine 3 between the forward and backward directions and to adjust the output of the propulsion machine 3. The battery 7 is connected to the electronic controller 4 to supply operation power to the electronic controller 4. Furthermore, the power of the battery 7 is also supplied to the vessel display device 2, and is also supplied to electrical components included in the propulsion machine 3. The fuel remaining amount meter 8 measures the remaining amount of fuel within a fuel tank 11 included in the vessel 1, and inputs a signal representing the result of the measurement to the electronic controller 4. The fuel within the fuel tank 11 is supplied to the propulsion machine 3 and is burned to produce the propulsion force. The water depth meter 9 measures the water depth around the vessel 1, and inputs a signal representing the value thereof to the electronic controller 4. The vessel speed meter 10 measures the traveling speed of the vessel 1, and inputs a signal representing the speed thereof to the electronic controller 4.

In this preferred embodiment, the propulsion machine 3 includes an internal combustion engine, that is, an engine 21. The engine 21 is a prime mover that receives fuel from the fuel tank 11 and burns the fuel to produce a drive force. The propulsion machine 3 is preferably, for example, an outboard motor that is attached to the rear tail plate of a vessel body. The outboard motor is able to be turned leftward and rightward with respect to the vessel body, and change the direction of the propulsion force to the left and right. The outboard motor includes a shift mechanism in which the rotation force of the engine is transmitted to a propeller to switch the rotation direction of the propeller between the forward direction and the backward direction. Thus, the outboard motor produces the propulsion force in the forward direction and the propulsion force in the backward direction. The shift mechanism includes a plurality of shift positions including a forward position which rotates the propeller in the forward direction, a backward position which rotates the propeller in the backward direction, and a neutral position which does not transmit the rotation force of the engine to the propeller. Furthermore, the outboard motor is arranged such that it is able to change an angle (trim angle) in an up/down direction with respect to the vessel body.

In this preferred embodiment, three propulsion machines 3P, 3C, and 3S (which are also collectively referred to as the "propulsion machine 3") are included, and these are aligned in the left/right direction and attached to the vessel stern. Specifically, the port propulsion machine 3P attached to the port side of the vessel stern, the center propulsion machine 3C attached to the center of the vessel stern, and the starboard propulsion machine 3S attached to the starboard side of the vessel stern are provided.

Each propulsion machine 3 includes, for example, the engine 21, a throttle actuator 22, a shift actuator 23, a steering actuator 24, and a trim actuator 25. The electronic controller 4 drives the steering actuator 24 based on a steering signal indicating the operation of the steering wheel 5. The steering actuator 24 steers the propulsion machine 3 in the left/right direction. In this way, the direction of the propulsion force is changed leftward and rightward with respect to the vessel body to change the traveling direction of the vessel 1. The electronic controller 4 controls, according to an output signal of the remote control lever 6, the throttle actuator 22 and the shift actuator 23. By controlling the shift actuator 23, the shift position of the shift mechanism is able to be set at any one of the forward position, the backward position, and the neutral position. By controlling the throttle actuator 22, the degree of throttle opening in the engine 21 is changed. Thus, the output of the engine 21 is adjusted, and the speed of the vessel 1 is changed accordingly. The trim actuator 25 is an actuator that changes the trim angle of the propulsion machine 3.

Each propulsion machine 3 further includes an engine tachometer 27, an engine thermometer 28, a coolant temperature meter 29, a coolant pressure meter 30, an oil pressure meter 31, an oil temperature meter 32, and a fuel flowmeter 33. The engine tachometer 27 measures the rotation speed of the engine 21 (prime mover rotation speed), and inputs a signal representing the value thereof to the electronic controller 4. The engine thermometer 28 measures the temperature (prime mover temperature) of the engine 21, and inputs a signal representing the temperature to the electronic controller 4. The coolant temperature meter 29 measures the temperature of a coolant that cools the engine 21, and inputs a signal representing the value thereof to the electronic controller 4. The coolant pressure meter 30 detects the pressure of the coolant, and inputs a signal representing the value thereof to the electronic controller 4. The oil pressure meter 31 measures the pressure of a lubricant lubricating the engine 21 and the like, and inputs a signal representing the value thereof to the electronic controller 4. The oil temperature meter 32 measures the temperature of the lubricant lubricating the engine 21 and the like, and inputs a signal representing the value thereof to the electronic controller 4. The fuel flowmeter 33 measures the flow rate of fuel supplied from the fuel tank 11 to the engine 21 and burned therein, and inputs a signal representing the value thereof to the electronic controller 4.

Figure 2:
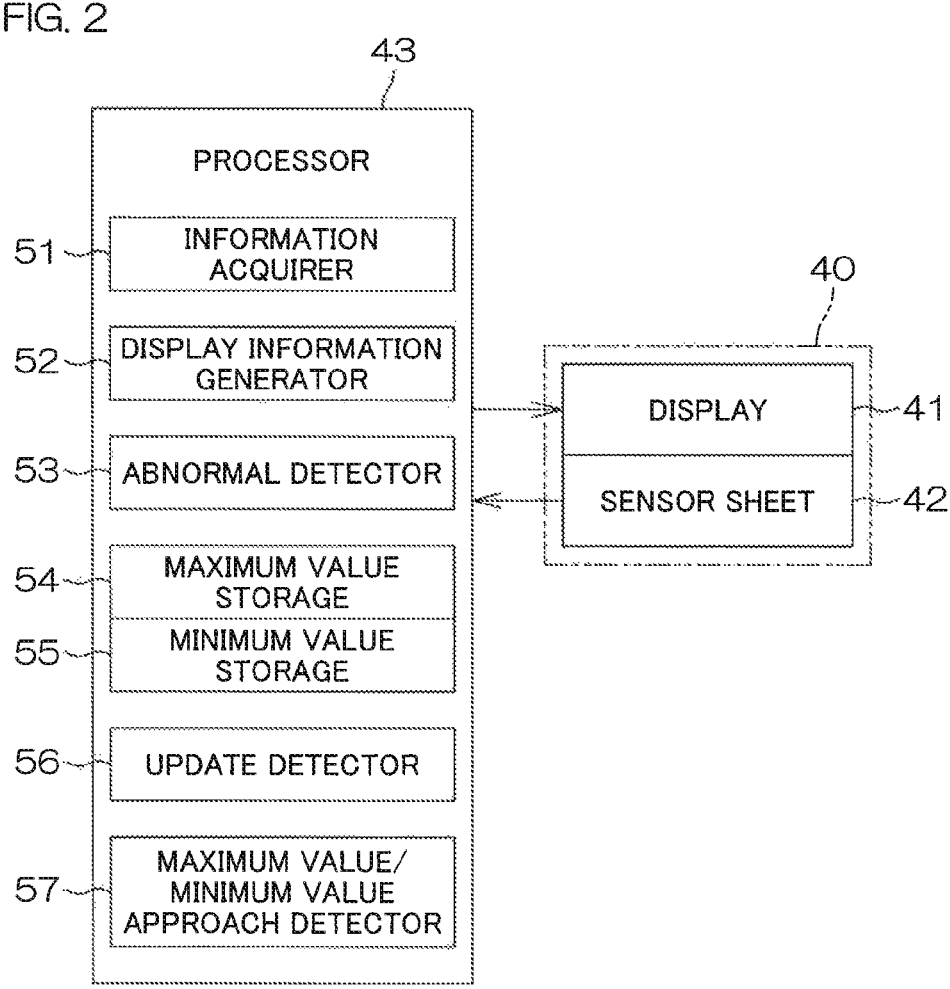
FIG. 2 is a block diagram for illustrating an electrical arrangement of the vessel display device.

FIG. 2 is a block diagram for illustrating an electrical arrangement of the vessel display device 2. The vessel display device 2 includes a touch panel 40 and a processor 43. The touch panel 40 includes a display 41 and a sensor sheet 42. The display 41 includes a display screen that displays information supplied from the processor 43. The sensor sheet 42 is a position input device to input a position on the display screen, and includes a transparent sheet (transparent film) disposed on the display screen of the display 41. For example, the sensor sheet 42 is a capacitance-type position input device, and is a transparent sheet member that is able to be seen through the display screen of the display 41.

The processor 43 is preferably a microcomputer, and includes a CPU, a ROM, and a RAM, and is arranged such that the CPU is operated according to a processing program stored in the ROM. Thus, the processor 43 is configured or programmed to performed functions as an information acquirer 51, a display information generator 52, an abnormal detector 53, a maximum value storage 54, a minimum value storage 55, an update detector 56, and a maximum value/minimum value approach detector 57.

The information acquirer 51 acquires information on a plurality of propulsion machines 3 from the electronic controller 4. The acquired information is information that is displayed in the vessel display device 2 and includes, for example, an engine rotation speed, an engine temperature, a coolant temperature, a coolant pressure, a lubricant pressure, a lubricant temperature, and the flow rate of fuel in each of propulsion machines 3. The acquired information may further include a battery voltage, the remaining amount of fuel, a water depth, and a vessel speed, for example.

The display information generator 52 generates display information arranging the display screen of the vessel display device 2. In this preferred embodiment, the display information generator 52 generates display information to display, on a single scale, the same types of information on the plurality of propulsion machines 3. The same types of information include the lubricant pressure, the coolant pressure, and the coolant temperature in the plurality of propulsion machines 3.

The abnormal detector 53 determines, based on the information acquired from the electronic controller 4, whether or not an abnormality occurs in the propulsion machine 3. For example, the abnormal detector 53 determines, for example, whether or not the lubricant pressure is excessively low, whether or not the coolant pressure is excessively low, and whether or not the coolant temperature is excessively high.

The maximum value storage 54 stores the past maximum value of the information acquired by the information acquirer 51. In this preferred embodiment, the entire speed region of the engine rotation speed is divided into a plurality of rotation speed regions, and the past maximum value of each of the rotation speed regions is stored in the maximum value storage 54.

The minimum value storage 55 stores the past minimum value of the information acquired by the information acquirer 51. In this preferred embodiment, the entire speed region of the engine rotation speed is divided into a plurality of rotation speed regions, and the past minimum value of each of the rotation speed regions is stored in the minimum value storage 55.

The update detector 56 determines whether or not the information acquired by the information acquirer 51 is higher than the past maximum value and whether or not the information acquired by the information acquirer 51 is lower than the past minimum value. In other words, the update detector 56 determines whether or not the past maximum value or the past minimum value is updated by the latest information acquired by the information acquirer 51.

The maximum value/minimum value approach detector 57 determines whether or not the information acquired by the information acquirer 51 is a high value close to the past maximum value and whether or not the information acquired by the information acquirer 51 is a low value close to the past minimum value.

Figure 3:
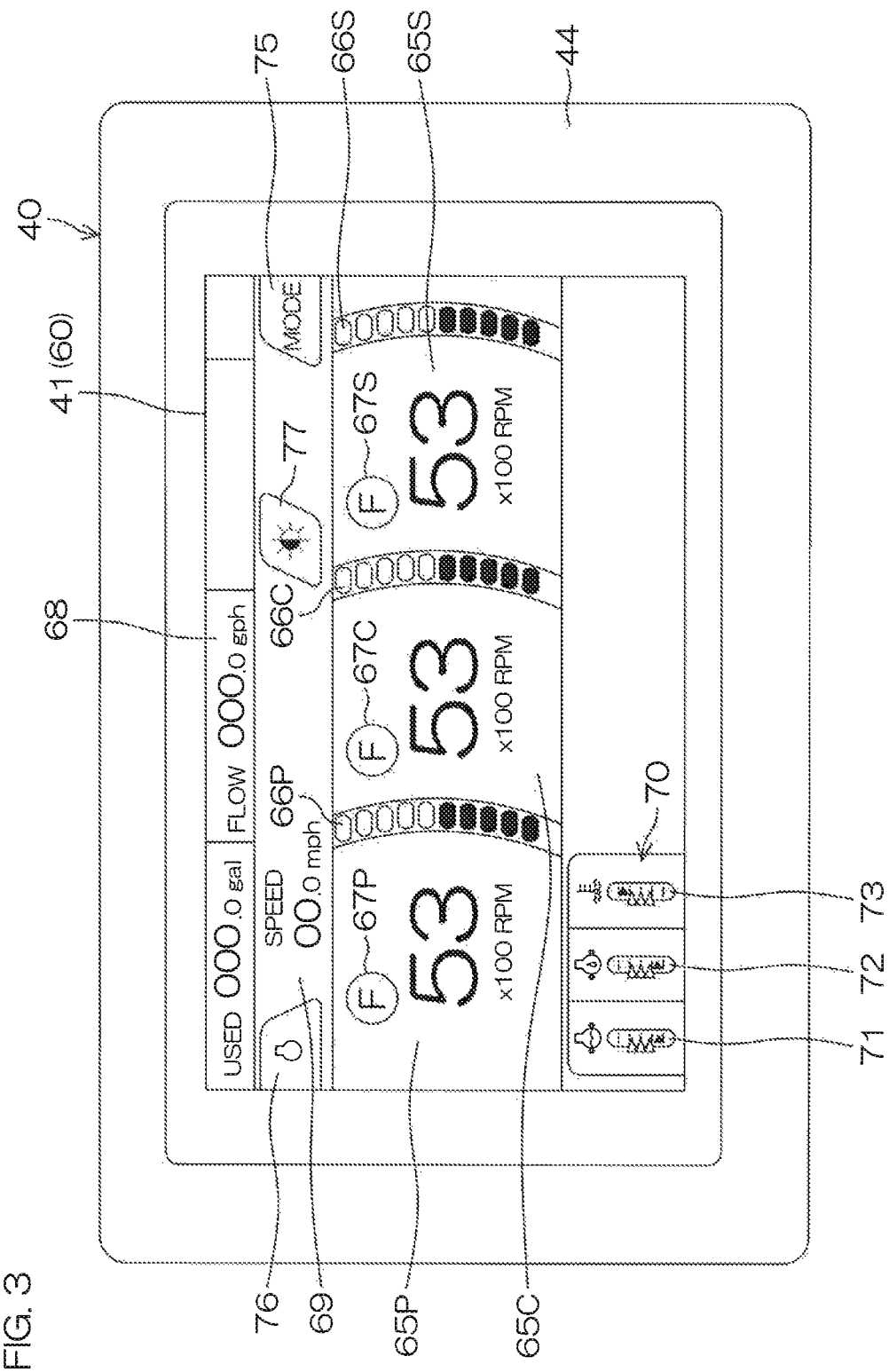
FIG. 3 is a plan view showing a specific arrangement example of the vessel display device.

FIG. 3 is a plan view showing an example of a specific arrangement of the touch panel 40. The touch panel 40 includes a frame 44 preferably having the shape of a quadrangle, and the display 41 is disposed such that the display screen is exposed within the frame 44. The sensor sheet 42 is disposed on the surface of the display screen of the display 41.

A display screen 60 displayed on the display 41 of the touch panel 40 by the supply of the display information from the processor 43 includes, in the example of FIG. 3, three engine rotation speed display portions 65P, 65C, and 65S that respectively display the engine rotation speeds of the three propulsion machines 3P, 3C, and 3S. The display screen 60 further includes trim angle display portions 66P, 66C, and 66S that are disposed on the right side of the engine rotation speed display portions 65P, 65C, and 65S and that respectively display the trim angles of the corresponding propulsion machines 3P, 3C, and 3S. The display screen 60 further includes shift position display portions 67P, 67C, and 67S that are disposed above the engine rotation speed display portions 65P, 65C, and 65S and that respectively display the shift positions of the corresponding propulsion machines 3P, 3C, and 3S. The display screen 60 further includes a fuel flow rate display portion 68 that displays the total fuel flow rate of the propulsion machines 3P, 3C, and 3S, a vessel speed display portion 69 that displays the speed of the vessel and an integrated display portion 70 that integrates and displays the states of the propulsion machines 3P, 3C, and 3S. The integrated display portion 70 includes a lubricant pressure display portion 71, a coolant pressure display portion 72, and a coolant temperature display portion 73.

The display screen 60 further includes, as operation buttons that are able to be operated by an operator, a mode switch button 75, a start button 76, and a brightness setting button 77. The start button 76 is a button that is operated by the operator so as to start the engines 21 of the three propulsion machines 3P, 3C, and 3S simultaneously. The brightness setting button 77 is a button that is operated so as to set the display brightness of the display 41. The mode switch button 75 is a button that is operated by the operator so as to switch to a vessel operation screen. The vessel operation screen is, for example, a screen that includes an operation button for an automatic vessel operation.

Figure 4:
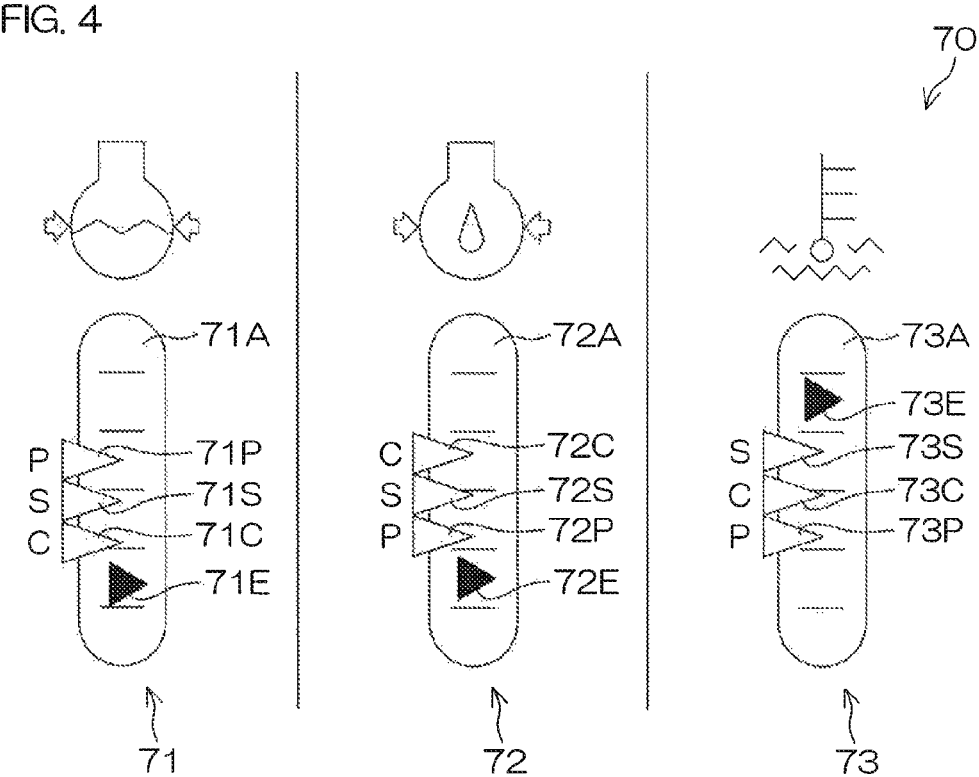
FIG. 4 is a diagram for illustrating a first display example of an integrated display portion disposed within a display screen of the vessel display device.

FIG. 4 is a diagram for illustrating a first arrangement example of the integrated display portion 70, that is, a first display example. In this example, the integrated display portion 70 includes the lubricant pressure display portion 71, the coolant pressure display portion 72, and the coolant temperature display portion 73, and they are disposed in a left/right direction (lateral direction). The lubricant pressure display portion 71 includes a hydraulic scale 71A extending in an up/down direction (vertical direction). Likewise, the coolant pressure display portion 72 includes a water pressure scale 72A extending in the up/down direction, and the coolant temperature display portion 73 includes a water temperature scale 73A extending in the up/down direction.

The lubricant pressure display portion 71 further includes a port machine hydraulic indicator 71P, a center machine hydraulic indicator 71S, and a starboard machine hydraulic indicator 71S disposed in common on the hydraulic scale 71A. In this preferred embodiment, these indicators 71P, 71C, and 71S preferably are lateral isosceles triangles whose apexes are directed to the center portion of the hydraulic scale 71A, for example. In the vicinity of the port machine hydraulic indicator 71P, that is, on the left side in this preferred embodiment, a target machine display "P" is disposed representing the port propulsion machine 3P which is a target propulsion machine of information indicated by the indicator 71P. Likewise, in the vicinity of the center machine hydraulic indicator 71C, a target machine display "C" representing the center propulsion machine 3C is disposed. Likewise, in the vicinity of the starboard machine hydraulic indicator 71S, a target machine display "S" representing the starboard propulsion machine 3S is disposed.

Likewise, in the coolant pressure display portion 72, a port machine water pressure indicator 72P, a center machine water pressure indicator 72C, and a starboard machine water pressure indicator 72S are disposed. These indicators 72P, 72C, and 72S are disposed in the up/down direction, and indicate the coolant pressures of the port propulsion machine 3P, the center propulsion machine 3C, and the starboard propulsion machine 3S, respectively. In the vicinity of the indicators 72P, 72C, and 72S, the target machine displays "P," "C" and "S" are disposed representing the corresponding propulsion machines 3P, 3C, and 3S, respectively.

The arrangement of the coolant temperature display portion 73 is the same, and on the water temperature scale 73A, a port machine water temperature indicator 73P, a center machine water temperature indicator 73C, and a starboard machine water temperature indicator 73S are disposed, and the coolant temperatures are represented by their positions in the up/down direction. In the vicinity of the indicators 73P, 73C, and 73S, the corresponding target machine displays "P," "C" and "S" are respectively disposed.

Figure 5:
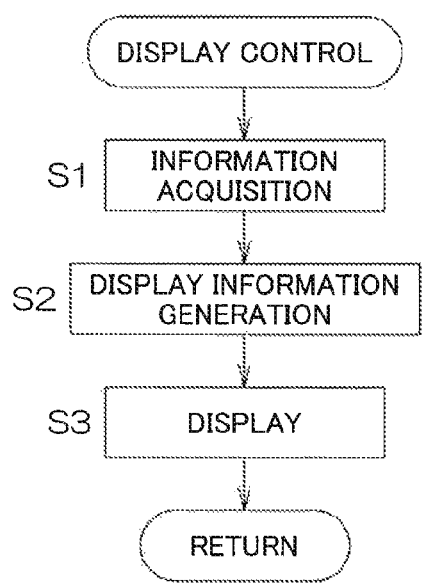
FIG. 5 is a flowchart for illustrating a process to generate the first display example.

FIG. 5 is a flowchart for illustrating a process performed by the processor 43 to generate the display of the integrated display portion 70 shown in FIG. 4. The processor 43 communicates with the electronic controller 4 to acquire information on the lubricant pressure measured by the oil pressure meter 31, the coolant pressure detected by the coolant pressure meter 30, and the water temperature detected by the coolant temperature meter 29 (step S1: the function of the information acquirer 51). Based on the acquired information, the processor 43 generates display information to be displayed on the integrated display portion 70 (step S2: the function of the display information generator 52). Then, based on the display information, the display 41 of the touch panel 40 is controlled, and thus the display shown in FIG. 4 is generated (step S3).

The display information for displaying the lubricant pressure display portion 71 by the processor 43 (the display information generator 52) includes display information on the hydraulic scale 71A, and further includes information on the port machine hydraulic indicator 71P, the center machine hydraulic indicator 71C, and the starboard machine hydraulic indicator 71S disposed on the hydraulic scale 71A. The disposition of the port machine hydraulic indicator 71P, the center machine hydraulic indicator 71C, and the starboard machine hydraulic indicator 71S on the hydraulic scale 71A is determined based on the lubricant pressures of the engines 21 of the port propulsion machine 3P, the center propulsion machine 3C, and the starboard propulsion machine 3S. According to the disposition thereof, the display information on the disposition of the hydraulic indicators 71P, 71C, and 71S on the hydraulic scale 71A is generated. The display information generated by the processor 43 further includes information on the target machine displays "P," "C" and "S" disposed in the vicinity of the hydraulic indicators 71P, 71C, and 71S.

Likewise, the display information for displaying the coolant pressure display portion 72 by the processor 43 (the display information generator 52) includes display information on the water pressure scale 72A, and further includes information on the port machine water pressure indicator 72P, the center machine water pressure indicator 72C, and the starboard machine water pressure indicator 72S disposed on the water pressure scale 72A. The disposition of the port machine water pressure indicator 72P, the center machine water pressure indicator 72C, and the starboard machine water pressure indicator 72S on the water pressure scale 72A is determined based on the coolant pressures of the engines 21 of the port propulsion machine 3P, the center propulsion machine 3C, and the starboard propulsion machine 3S. According to the disposition thereof, the display information on the disposition of the water pressure indicators 72P, 72C, and 72S on the water pressure scale 72A is generated. The display information generated by the processor 43 further includes information on the target machine displays "P," "C" and "S" disposed in the vicinity of the water pressure indicators 72P, 72C, and 72S.

Likewise, the display information for displaying the coolant temperature display portion 73 by the processor 43 (the display information generator 52) includes display information on the water temperature scale 73A, and further includes information on the port machine water temperature indicator 73P, the center machine water temperature indicator 73C, and the starboard machine water temperature indicator 73S disposed on the water temperature scale 73A. The disposition of the port machine water temperature indicator 73P, the center machine water temperature indicator 73C, and the starboard machine water temperature indicator 73S on the water temperature scale 73A is determined based on the coolant temperatures of the engines 21 of the port propulsion machine 3P, the center propulsion machine 3C, and the starboard propulsion machine 3S. According to the disposition thereof, the display information on the disposition of the water temperature indicators 73P, 73C, and 73S on the water temperature scale 73A is generated. The display information generated by the processor 43 further includes information on the target machine displays "P," "C" and "S" disposed in the vicinity of the water temperature indicators 73P, 73C, and 73S.

As described above, the same type of information on a plurality of propulsion machines 3P, 3C, and 3S included in the vessel is displayed on a single scale, i.e., 71A, 72A, or 73A. Hence, since in a small display region, the same types of information on a plurality of propulsion machines 3 is able to be displayed, and the limited display region on the display 41 is effectively utilized. That is, as compared with a case where individual display regions are provided where display items on each of a plurality of propulsion machines 3 are displayed, it is possible to reduce the necessary display regions. In other words, information on a larger number of items on a plurality of propulsion machines 3 is able to be simultaneously displayed on the integrated display portion 70. Hence, the user is not required to choose display items, and the designer of the vessel display device 2 does not need to prepare the mechanism so that the user has the ability to choose display items. In this way, it is possible to reduce the burden on the user and to reduce the burden on the development and design of the vessel display device 2.

Since the same types of information on a plurality of propulsion machines 3 are integrally displayed on the single scales 71A, 72A, and 73A, it is possible to efficiently develop and design the screen design corresponding to the number of propulsion machines 3 and to reduce the burden thereof. Moreover, since the information on a plurality of propulsion machines 3 is integrally displayed on the single scales 71A, 72A, and 73A, the user is able to easily recognize the information on a plurality of propulsion machines 3. In this way, the user is able to easily make an appropriate determination based on the displayed information. Thus, it is possible to reduce the burden of recognition of information and determination on the user and to provide the vessel display device 2 including a user-friendly display function.

In this preferred embodiment, the single scales 71A, 72A and 73A preferably display the same types of information on a plurality of propulsion machines 3 with a target machine display. In this way, within the small display region where the single scales 71A, 72A and 73A are disposed, the information on a plurality of propulsion machines 3 is able to be displayed in a distinguishable format.

Figure 6:
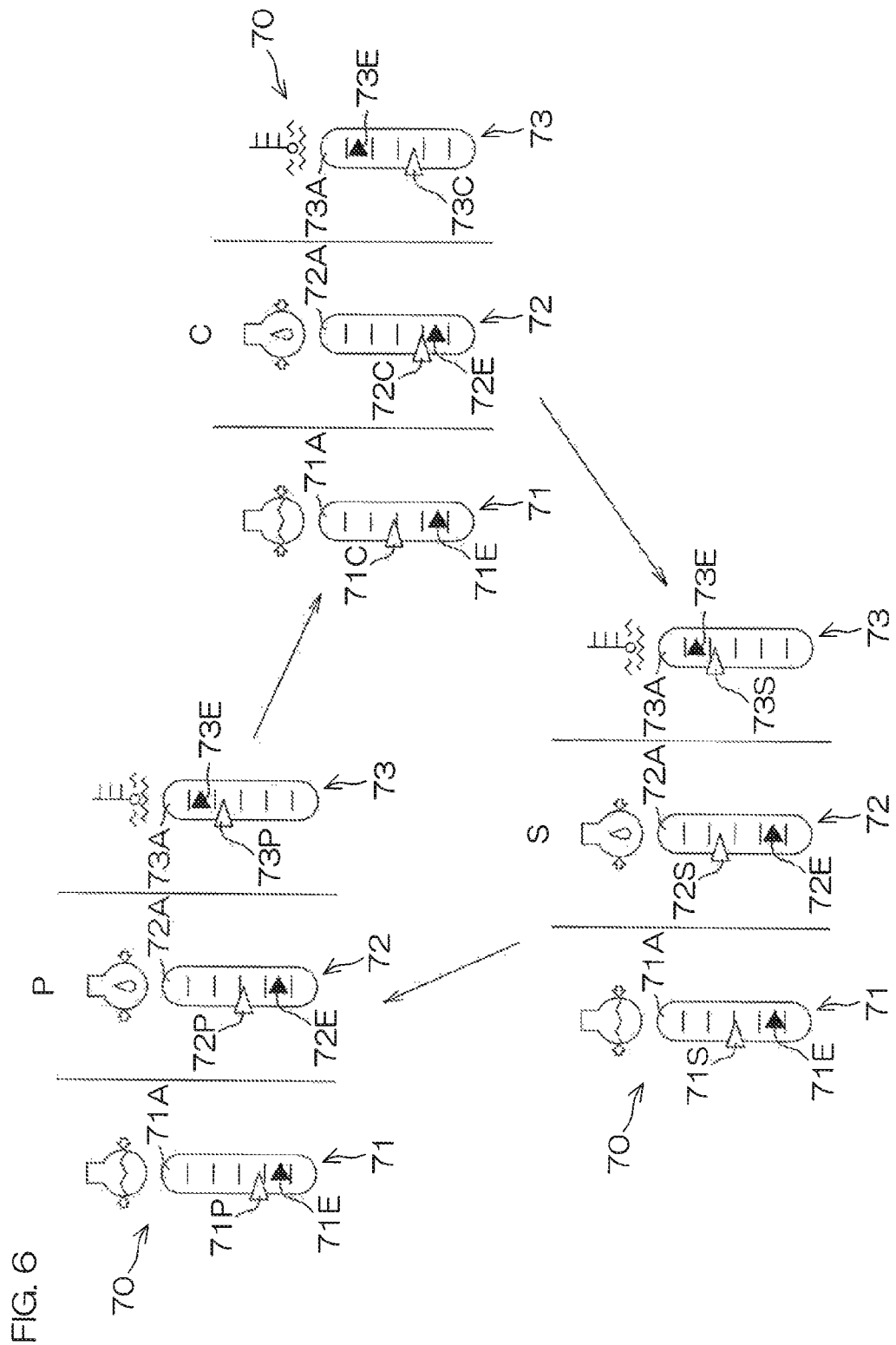
FIG. 6 is a diagram for illustrating a second display example of the integrated display portion.

FIG. 6 is a diagram for illustrating a second arrangement example, that is, a second display example of the integrated display portion 70. As in the case of the first display example, the integrated display portion 70 includes the lubricant pressure display portion 71, the coolant pressure display portion 72, and the coolant temperature display portion 73, and they are disposed in the left/right direction. The lubricant pressure display portion 71, the coolant pressure display portion 72, and the coolant temperature display portion 73 respectively include the hydraulic scale 71A, the water pressure scale 72A, and the water temperature scale 73A extending in the up/down direction. On the hydraulic scale 71A, one hydraulic indicator 71P, 71C, or 71S is disposed, on the water pressure scale 72A, one water pressure indicator 72P, 72C, or 72S is disposed, and on the water temperature scale 73A, one water temperature indicator 73P, 73C, or 73S is disposed.

In this display example, the displays on the port propulsion machine 3P, on the center propulsion machine 3C, and on the starboard propulsion machine 3S are sequentially switched, and are displayed in the same display region in a circulating manner for a predetermined time (for example, 5 seconds).

In other words, when the information on the port propulsion machine 3P is displayed, the lubricant pressure, the coolant pressure and the coolant temperature of the port propulsion machine 3P are displayed on the integrated display portion 70. Specifically, the lubricant pressure display portion 71, the coolant pressure display portion 72, and the coolant temperature display portion 73 of the integrated display portion 70 respectively display the lubricant pressure, the coolant pressure, and the coolant temperature of the port propulsion machine 3P by the disposition of the indicators 71P, 72P and 73P on the scales 71A, 72A and 73A. Then, the target machine display "P" representing the port propulsion machine 3P corresponding to the information being displayed is, for example, disposed on an upper portion of the integrated display portion 70.

Likewise, when the information on the center propulsion machine 3C is displayed, in the lubricant pressure display portion 71, the coolant pressure display portion 72, and the coolant temperature display portion 73, on the hydraulic scale 71A, the water pressure scale 72A, and the water temperature scale 73A, the indicators 71C, 72C, and 73C representing the lubricant pressure, the coolant pressure, and the coolant temperature of the center propulsion machine 3C are disposed. Then, in an upper portion of the integrated display portion 70, the target machine display "C" is disposed. Moreover, likewise, when the information on the starboard propulsion machine 3S is displayed on the integrated display portion 70, the displays on the lubricant pressure display portion 71, the coolant pressure display portion 72, and the coolant temperature display portion 73 represent the lubricant pressure, the coolant pressure, and the coolant temperature of the starboard propulsion machine 3S with the disposition of the indicators 71S, 72S, and 73S on the scales 71A, 72A, and 73A. Then, in an upper portion of the integrated display portion 70, the target machine display "S" representing the starboard propulsion machine 3S is disposed.

When an abnormality occurs in any propulsion machine 3 while the vessel is being operated, the circulating switch display at intervals of the predetermined time is stopped, and the display of the integrated display portion 70 is fixed to the display of the information on the propulsion machine 3 having the abnormality.

Figure 7:
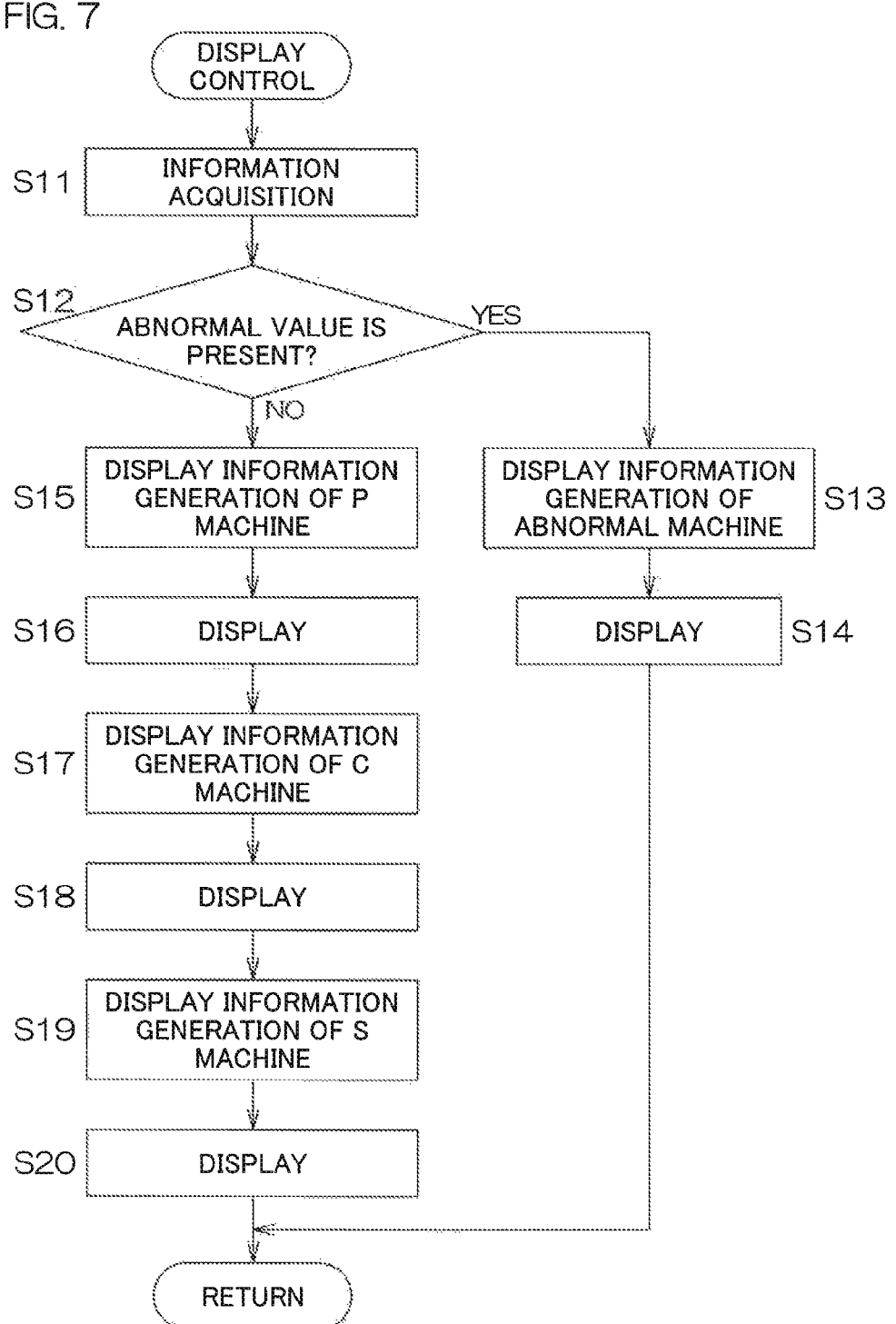
FIG. 7 is a flowchart for illustrating a process to generate the second display example.

FIG. 7 is a flowchart for illustrating a process performed by the processor 43 to generate this display example. The processor 43 acquires, from the electronic controller 4, the information on the lubricant pressure, the coolant pressure, and the coolant temperature of the port propulsion machine 3P, the center propulsion machine 3C, and the starboard propulsion machine 3S (step S11: the function of the information acquirer 51). The processor 43 determines whether or not an abnormal value is present in the acquired information (step S12: the function of the abnormal detector 53). When an abnormal value is present (step S12: YES), display information on the propulsion machine 3 having the abnormality is generated (step S13: the function of the display information generator 52), and the information is displayed on the integrated display portion 70 within the screen of the display 41 (step S14).

When an abnormal value is not present (step S12: NO), the processor 43 generates display information to display the lubricant pressure, the coolant pressure, and the coolant temperature of the port propulsion machine 3P on the lubricant pressure display portion 71, the coolant pressure display portion 72, and the coolant temperature display portion 73, respectively (step S15: the function of the display information generator 52). Then, the processor 43 displays the information on the integrated display portion 70 within the screen of the display 41 for a predetermined time (for example, 5 seconds) (step S16).

Thereafter, the processor 43 generates display information to display the lubricant pressure, the coolant pressure, and the coolant temperature of the center propulsion machine 3C on the lubricant pressure display portion 71, the coolant pressure display portion 72, and the coolant temperature display portion 73, respectively (step S17: the function of the display information generator 52). Then, the processor 43 displays the information on the integrated display portion 70 within the screen of the display 41 for a predetermined time (for example, 5 seconds) (step S18). Thereafter, the processor 43 generates display information to display the lubricant pressure, the coolant pressure, and the coolant temperature of the starboard propulsion machine 3S on the lubricant pressure display portion 71, the coolant pressure display portion 72, and the coolant temperature display portion 73, respectively (step S19: the function of the display information generator 52). Then, the processor 43 displays the information on the integrated display portion 70 within the screen of the display 41 for a predetermined time (for example, 5 seconds) (step S20). Such operations are repeatedly performed.

As described above, in this display example, since the information on a plurality of propulsion machines 3 is sequentially switched and displayed with the common scales 71A, 72A, and 73A, it is possible to produce a display within the small integrated display portion 70 such that information on a plurality of propulsion machines 3 is distinguished with satisfactory visibility. Then, when an abnormality occurs in any propulsion machine 3, since the information on the propulsion machine 3 having the abnormality is fixedly displayed on the integrated display portion 70, it is possible to continuously provide the information on the propulsion machine 3 to which the user most needs to give attention.

Figure 8:
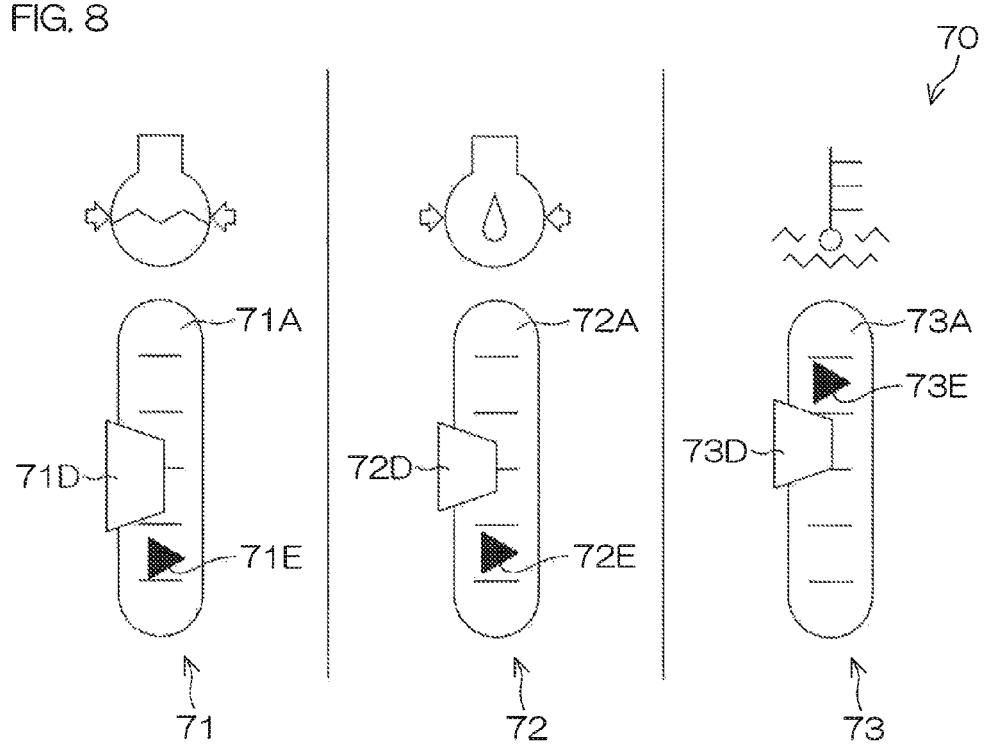
FIG. 8 is a diagram for illustrating a third display example of the integrated display portion.

FIG. 8 is a diagram for illustrating a third arrangement example, that is, a third display example of the integrated display portion. The integrated display portion 70 includes the lubricant pressure display portion 71, the coolant pressure display portion 72, and the coolant temperature display portion 73, and they are disposed in the left/right direction. The lubricant pressure display portion 71, the coolant pressure display portion 72, and the coolant temperature display portion 73 respectively include the hydraulic scale 71A, the water pressure scale 72A, and the water temperature scale 73A extending in the up/down direction.

In the lubricant pressure display portion 71, on the hydraulic scale 71A, a strip-shaped hydraulic range indicator 71D extending in the longitudinal direction of the hydraulic scale 71A so as to indicate a lubricant pressure range is disposed. The hydraulic range indicator 71D represents, on the hydraulic scale 71A, a range between the maximum value and the minimum value of the lubricant pressures of a plurality of propulsion machines 3.

Likewise, in the coolant pressure display portion 72, on the water pressure scale 72A, a strip-shaped water pressure range indicator 72D extending in the longitudinal direction of the water pressure scale 72A so as to represent a coolant pressure range is disposed. The water pressure range indicator 72D represents, on the water pressure scale 72A, a range between the maximum value and the minimum value of the coolant pressures of a plurality of propulsion machines 3.

Likewise, in the coolant temperature display portion 73, on the water temperature scale 73A, a strip-shaped water temperature range indicator 73D extending in the longitudinal direction of the water temperature scale 73A is disposed so as to represent a coolant temperature range. The water temperature range indicator 73D represents, on the water temperature scale 73A, a range between the maximum value and the minimum value of the coolant temperatures of a plurality of propulsion machines 3.

Figure 9:
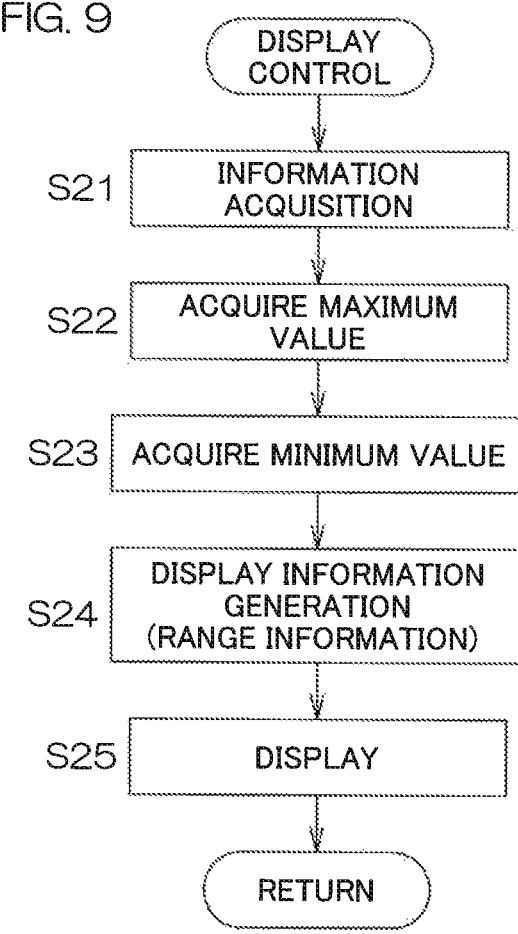
FIG. 9 is a flowchart for illustrating a process to generate the third display example.

FIG. 9 is a flowchart for illustrating a process performed by the processor 43 to generate the display example described above. The processor 43 acquires, from the electronic controller 4, the information on the lubricant pressure, the coolant pressure, and the coolant temperature of the port propulsion machine 3P, the center propulsion machine 3C, and the starboard propulsion machine 3S (step S21: the function of the information acquirer 51).

The processor 43 determines the maximum value and the minimum value among the values of the lubricant pressures of a plurality of propulsion machines 3, determines the maximum value and the minimum value among the values of the coolant pressures of a plurality of propulsion machines 3, and determines the maximum value and the minimum value among the values of the coolant temperatures of a plurality of propulsion machines 3 (steps S22 and S23). Based on these, the processor 43 determines the range of the lubricant pressure, the range of the coolant pressure, and the range of the coolant temperature. Then, the processor 43 determines the disposition and the length of the hydraulic range indicator 71D, the water pressure range indicator 72D, and the water temperature range indicator 73D representing those ranges. Based on this, the processor 43 generates display information in which the hydraulic scale 71A, the water pressure scale 72A, and the water temperature scale 73A, the hydraulic range indicator 71D, the water pressure range indicator 72D, and the water temperature range indicator 73D are respectively disposed (step S24). Based on the display information, within the screen on the display 41, the integrated display portion 70 is displayed (step S25).

By such a display, the user is able to recognize at once the information on a plurality of propulsion machines 3. For example, it is possible to confirm that the water temperatures and the like of all the propulsion machines 3 fall within normal values and that the water temperature and the like of at least one propulsion machine 3 is an abnormal value.

Figure 10:
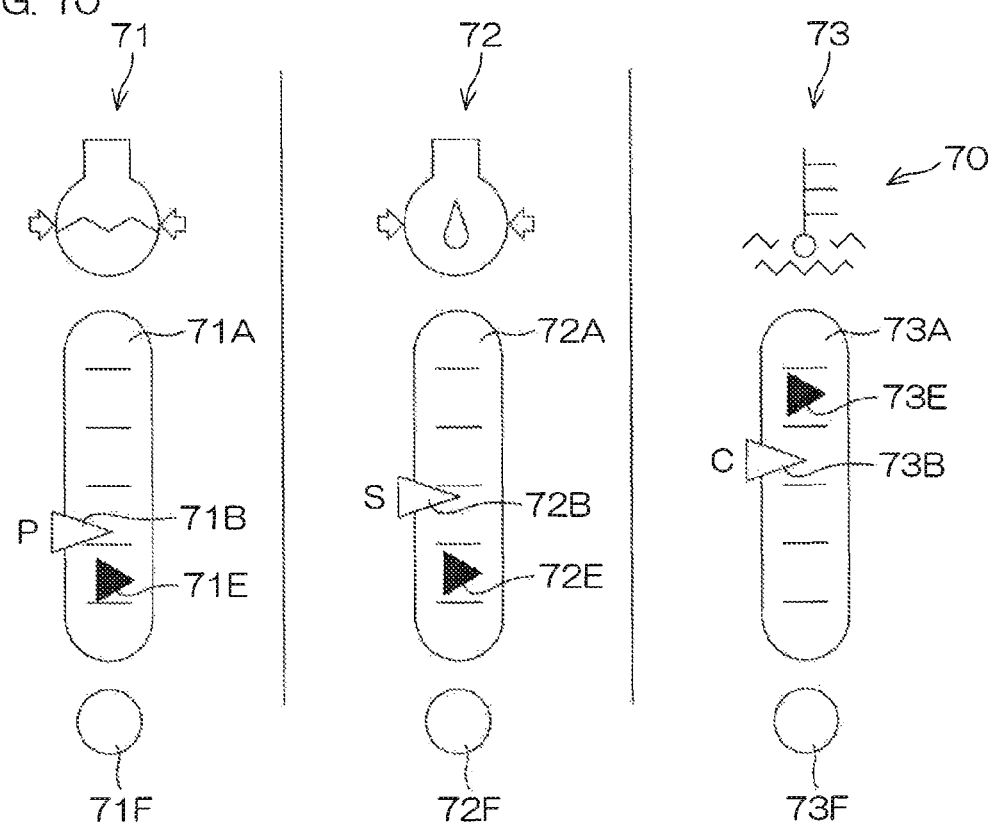
FIG. 10 is a diagram for illustrating a fourth display example of the integrated display portion.

FIG. 10 is a diagram for illustrating a fourth arrangement example, that is, a fourth display example of the integrated display portion. The integrated display portion 70 includes the lubricant pressure display portion 71, the coolant pressure display portion 72, and the coolant temperature display portion 73, and are disposed in the left/right direction. The lubricant pressure display portion 71, the coolant pressure display portion 72, and the coolant temperature display portion 73 respectively include the hydraulic scale 71A, the water pressure scale 72A, and the water temperature scale 73A extending in the up/down direction. On the hydraulic scale 71A, one hydraulic indicator 71B is disposed, on the water pressure scale 72A, one water pressure indicator 72B is disposed, and on the water temperature scale 73A, one water temperature indicator 73B is disposed. In the vicinity of the hydraulic indicator 71B, the water pressure indicator 72B and the water temperature indicator 73B, the target machine displays "P," "C" and "S" that respectively correspond to the oil pressure, the water pressure, and the water temperature displayed are disposed.

In this display example, among the information on the port propulsion machine 3P, on the center propulsion machine 3C, and on the starboard propulsion machine 3S, the information having a value closest to an abnormal value is extracted, and such information is displayed on each of the display portions 71, 72, and 73. With respect to the lubricant pressure, in contrast to a case where its value is high, when its value is low it is highly likely that an abnormality occurs. Hence, among the lubricant pressures of the port propulsion machine 3P, the center propulsion machine 3C, and the starboard propulsion machine 3S, the minimum lubricant pressure is determined, and the hydraulic indicator 71B is disposed on the hydraulic scale 71A such that the minimum lubricant pressure is represented. In the display example of FIG. 10, the lubricant pressure of the port propulsion machine 3P is the minimum value.

Likewise, with respect to the coolant pressure, in contrast to a case where its value is high, when its value is low it is highly likely that an abnormality occurs. Hence, among the coolant pressures of the port propulsion machine 3P, the center propulsion machine 3C, and the starboard propulsion machine 3S, the minimum value is identified, and the water pressure indicator 72B representing the minimum coolant pressure is disposed on the water pressure scale 72A. In the display example of FIG. 10, the coolant pressure of the starboard propulsion machine 3S is the minimum value.

With respect to the coolant temperature, in contrast to a case where its value is low, when its value is high it is highly likely that an abnormality occurs. Hence, among the coolant temperatures of the port propulsion machine 3P, the center propulsion machine 3C, and the starboard propulsion machine 3S, the highest coolant temperature is determined, and the water temperature indicator 73B is disposed on the water temperature scale 73A such that the highest coolant temperature is represented. In the display example of FIG. 10, the coolant temperature of the center propulsion machine 3C is the maximum value.

Furthermore, in this display example, when power is supplied to the vessel display device 2, the values (the maximum value or the minimum value) closest to the abnormal values of the lubricant pressure, the coolant pressure, and the coolant temperature are recorded. In other words, with respect to the lubricant pressure, the past minimum value is recorded, with respect to the coolant pressure, the past minimum value is recorded and with respect to the coolant temperature, the past maximum value is recorded. The past minimum value or the past maximum value is displayed on the integrated display portion 70. Specifically, in the lubricant pressure display portion 71, on the hydraulic scale 71A, the past minimum value of the lubricant pressure is represented by the disposition of a minimum hydraulic indicator 71E. In the coolant pressure display portion 72, on the water pressure scale 72A, the past minimum value of the coolant pressure is represented by the disposition of a minimum water pressure indicator 72E. In the coolant temperature display portion 73, on the water temperature scale 73A, a maximum water temperature indicator 73E representing the past maximum value of the coolant temperature is disposed.

Furthermore, in this display example, the lubricant pressure display portion 71 includes a hydraulic state indicator 71F, the coolant pressure display portion 72 includes a water pressure state indicator 72F, and the coolant temperature display portion 73 includes a water temperature state indicator 73F. The hydraulic state indicator 71F is displayed in a normal display color (for example, blue) in the normal state, is displayed in an approach display color (for example, yellow) when the past minimum value of the lubricant pressure is approached, and is displayed in an abnormal display color (for example, red) when the past minimum value of the lubricant pressure is updated. The water pressure state indicator 72F is displayed in a normal display color (for example, blue) in a normal state, is displayed in an approach display color (for example, yellow) when the past minimum value is approached and is displayed in an abnormal display color (for example, red) when the past minimum value is updated. The water temperature state indicator 73F is displayed in an approach display color (for example, yellow) when the past maximum value of the coolant temperature is approached, is displayed in an abnormal display color (for example, red) when the past maximum value of the coolant temperature is updated, and is displayed in a normal display color (for example, blue) in the normal state other than those states.

Instead of providing the state indicators 71F, 72F, and 73F, the hydraulic indicator 71B, the water pressure indicator 72B, and the water temperature indicator 73B are also able to be used as the state indicators. That is, the hydraulic indicator 71B may be displayed in the normal display color (for example, blue) in the normal state, may be displayed in the approach display color (for example, yellow) when the past minimum value is approached, and may be displayed in the abnormal display color (for example, red) when the past minimum value is updated. Likewise, the water pressure indicator 72B may be displayed in the normal display color (for example, blue) in the normal state, may be displayed in the approach display color (for example, yellow) when the past minimum value is approached, and may be displayed in the abnormal display color (for example, red) when the past minimum value is updated. The water temperature indicator 73B may be displayed in the approach display color (for example, yellow) when the past maximum value is approached, may be displayed in the abnormal display color (for example, red) when the past maximum value is updated, and may be displayed in the normal display color (for example, blue) in the normal state other than those states.

FIG. 11 is a flowchart for illustrating a process performed by the processor 43 to generate the fourth display example. The processor 43 acquires, from the electronic controller 4, the information indicating the lubricant pressure, the coolant pressure, and the coolant temperature of the port propulsion machine 3P, the center propulsion machine 3C, and the starboard propulsion machine 3S (step S31: the function of the information acquirer 51). Furthermore, the processor 43 determines the maximum value and the minimum value of the lubricant pressure, the coolant pressure, and the coolant temperature (steps S32 and S33). In particular, with respect to the lubricant pressure and the coolant pressure, among the corresponding values of a plurality of propulsion machines 3, at least the minimum value is acquired, and with respect to the coolant temperature, among the corresponding values of a plurality of propulsion machines 3, at least the maximum value is acquired.

Furthermore, the processor 43 acquires an engine rotation speed from the electronic controller 4, and determines an engine rotation speed region to which the current engine rotation speed belongs (step S34). The processor 43 stores, for each engine rotation speed region, the past maximum value and the past minimum value of the lubricant pressure, the coolant pressure, and the coolant temperature. Hence, the processor 43 determines whether or not the past maximum value is updated (step S35) and determines whether or not the past minimum value is updated (step S37), and when they are updated, the past maximum value and the past minimum value are updated (steps S36 and S38).

More specifically, the maximum value storage 54 (see FIG. 2) of the processor 43 stores, for each of a plurality of engine rotation speed regions, the past maximum values of the lubricant pressure, the coolant pressure, and the coolant temperature. The past maximum value refers to the maximum value until now since the start of the recording of each piece of information after the supply of power to the vessel display device 2. When information is newly acquired, the maximum value storage 54 compares the acquired information with the past stored maximum value according to the current engine rotation speed region. Then, when the new information is higher than the past maximum value (step S35: YES), the maximum value storage 54 updates the past maximum value to the new information (step S36).

Likewise, the minimum value storage 55 (see FIG. 2) of the processor 43 stores, for each of a plurality of engine rotation speed regions, the past minimum values of the lubricant pressure, the coolant pressure, and the coolant temperature. The past minimum value refers to the minimum value until now since the start of the recording of each piece of information after the supply of power to the vessel display device 2. When information is newly acquired, the minimum value storage 55 compares the acquired information with the past stored minimum value according to the current engine rotation speed region. Then, when the new information is lower than the past minimum value (step S37: YES), the minimum value storage 55 updates the minimum value to the new information (step S38).

Furthermore, the processor 43 determines whether or not a predetermined time (for example, 5 minutes) has elapsed after the start of recording of the past maximum value and the past minimum value (step S39). Before the predetermined time has elapsed (step S39: NO), the processor 43 does not produce a display on the past maximum value/minimum value, and selects a value closest to the side of abnormality among a plurality of propulsion machines 3 (the maximum value or the minimum value acquired in step S32 or S33). Then, the processor 43 generates display information to display the indicators 71B, 72B, and 73B indicating the values on the scales 71A, 72A, and 73A (step S45: the function of the display information generator 52). In this way, in the integrated display portion 70 within the screen displayed on the display 41, on the hydraulic scale 71A, the water pressure scale 72A, and the water temperature scale 73A, the corresponding values of one propulsion machine 3 on the side close to the abnormal value are indicated by the indicators 71B, 72B, and 73B (step S46). In this case, the displays of the minimum hydraulic indicator 71E, the minimum water pressure indicator 72E, and the maximum water temperature indicator 73E are omitted. The state indicators 71F, 72F, and 73F are displayed in the normal display color (for example, blue).

On the other hand, when the predetermined time has elapsed since the start of the recording of the past maximum value and the past minimum value after the supply of power to the vessel display device 2 (step S39: YES), processing on the displays of these values is performed. Specifically, among the past maximum value and the past minimum value, the values on the side of the abnormal value are acquired (step S40), and whether or not the values are updated is determined (step S41: the function of the update detector 56). When they are updated (step S41: YES), the display color of the corresponding state indicators 71F, 72F, and 73F is set at the abnormal display color (for example, red) (step S42). When they are not updated (step S41: NO), whether or not they approach the values on the side of the abnormal value (the past maximum value or the past minimum value) is determined (step S43: the function of the maximum value/minimum value approach detector 57). When they approach the values on the side of the abnormal value (step S43: YES), the display color of the corresponding state indicators 71F, 72F, and 73F is set at the approach display color (for example, yellow) (step S44).

Then, the processor 43 generates display information to display the state indicators 71F, 72F, and 73F and the indicators 71E, 72E, and 73E of the past maximum value/the past minimum value (step S45). In this way, in the integrated display portion 70, together with the hydraulic indicator 71B, the water pressure indicator 72B, and the water temperature indicator 73B, the minimum hydraulic indicator 71E, the minimum water pressure indicator 72E, and the maximum water temperature indicator 73E are displayed on the corresponding scales 71A, 72A, and 73A (step S46). When the display color of the state indicators 71F, 72F, and 73F is not set at the approach display color or the abnormal display color, the display color thereof is assumed to be the normal display color (for example, blue).

As described above, in this display example, in the integrated display portion 70, the maximum value or the minimum value among the information on a plurality of propulsion machines 3 is displayed according to the display item, and furthermore, the past maximum value or the past minimum value is displayed on the same scale. In this way, the user is able to recognize whether or not an abnormality occurs or an indication thereof. Then, the fact that the displayed information approaches the past maximum value/ minimum value is displayed by the state indicators 71F, 72F, and 73F, and furthermore, the fact that the information thereof updates the past maximum value/minimum value is also displayed by the state indicators 71F, 72F, and 73F. In this way, the user is able to reliably recognize whether or not an abnormality occurs or an indication thereof.

Furthermore, in this display example, for each of a plurality of engine rotation speed regions, the past maximum value/the past minimum value of the information on a plurality of propulsion machines 3 are recorded. The past maximum value/the past minimum value of the engine rotation speed region to which the current engine rotation speed belongs are displayed on the scales of the integrated display portion 70. In this way, it is possible to produce an appropriate display corresponding to the current state of the propulsion machine 3. In other words, the user is able to reliably determine, according to the engine rotation speed of the propulsion machine 3, whether or not an abnormality occurs in the propulsion machine 3 and whether or not an indication of an abnormality is produced.

Furthermore, in this display example, until the predetermined time has elapsed since the start of the recording of the past minimum value or the past maximum value, the past information is not reflected in the integrated display portion 70. In this way, since highly reliable information is displayed on the integrated display portion 70, the user is able to correctly recognize, based on the display of the integrated display portion 70, whether or not an abnormality occurs or an indication thereof.

Although preferred embodiments of the present invention have been described above, as illustrated below, the present invention can be carried out with other preferred embodiments.

As shown in FIGS. 4, 6, and 8, even in the first to third display examples, as in the case of the fourth display example (see FIG. 10), the minimum hydraulic indicator 71E, the minimum water pressure indicator 72E, and the maximum water temperature indicator 73E may be respectively displayed on the scales 71A, 72A and 73A.

Even in the first to third display examples (see FIGS. 4, 6 and 8), as in the case of the fourth display example (see FIG. 10), the state indicators 71F, 72F, and 73F may be provided. By changing the color or the like of the indicator on each scale, the indicator may also have the function of the state indicator.

In the preferred embodiments described above, the example where the scale extends linearly in the up/down direction (vertical direction) of the display screen is described. However, the scale may have another format. Specifically, the scale may extend linearly in the left/right direction (lateral direction) of the display screen. The scale may extend in the shape of a curve (for example, in the shape of an arc). Furthermore, a scale in the shape of a sector or a circle may be used.

In the indicators disposed on the scale, one or more of the character, the figure (shape), the position, the color, and the size thereof may be different to indicate information on which propulsion machine is displayed. For example, on the left side of the scale extending linearly in the up/down direction, the indicator corresponding to the port propulsion machine 3P may be disposed, in the center of the scale, the indicator corresponding to the center propulsion machine 3C may be disposed, and on the right side of the scale, the indicator corresponding to the starboard propulsion machine 3S may be disposed.

In the preferred embodiments described above, the example where on the integrated display portion 70, the lubricant pressure, the coolant pressure, and the coolant temperature preferably are displayed is described. However, this is simply an example, and for example, an arbitrary combination of one or more of the engine rotation speed (prime mover rotation speed), the engine temperature (prime mover temperature), the coolant temperature, the coolant pressure, the lubricant pressure, the lubricant temperature, and the fuel flow rate may be displayed on an integrated display portion 70. When a battery is provided for each propulsion machine 3, the voltages of the batteries corresponding to the plurality of propulsion machines 3 may be displayed on a single scale in the integrated display portion 70. The vessel display device 2 may include an arrangement in which items to be displayed on the integrated display portion 70 are selected and set by the user. Specifically, the arrangement may be such that the display screen of the touch panel 40 is able to be switched to a setting screen and on the setting screen, display items in the integrated display portion 70 are set.

In the preferred embodiments described above, as an example of the vessel display device, the vessel display device 2 including the touch panel function is described. However, the present invention can be applied to a vessel display device that does not have the touch panel function.

The type of propulsion machine, the number of propulsion machines, the type of prime mover and the like included in the vessel are arbitrary. In other words, the propulsion machine may be a type other than an outboard motor such as an inboard motor, an inboard/outboard motor, or a water jet. The vessel may include one, two, or four or more propulsion machines. However, when two or more propulsion machines are provided, the present invention contributes to the efficient utilization of the display region of the vessel display device 2. Furthermore, the prime mover of the propulsion machine may be an electric motor or a hybrid type in which an internal combustion engine and an electric motor are combined.

The present application claims priority to Japanese Patent Application No. 2015-086927 filed in the Japan Patent Office on Apr. 21, 2015, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel display device that displays information on a vessel, the vessel display device comprising:
    an information acquirer that acquires a same type of information on a plurality of propulsion machines included in the vessel;
    a display information generator that generates, based on the same type of information acquired by the information acquirer, display information which displays information on the plurality of propulsion machines on a single scale; and
    a display that displays the display information generated by the display information generator; wherein each of the plurality of propulsion machines includes an engine.

2. The vessel display device according to claim 1, wherein the display information generator generates display information which displays the same type of information on the plurality of propulsion machines in a different format on the single scale.

3. The vessel display device according to claim 1, wherein the display information generator generates display information which sequentially displays the same type of information on the plurality of propulsion machines on the single scale.

4. The vessel display device according to claim 3, further comprising:
an abnormality detector that determines whether or not an abnormality occurs in any one of the plurality of propulsion machines; wherein
when the abnormality detector determines that an abnormality occurs in any one of the plurality of propulsion machines, the display information generator generates display information which fixedly displays information on the propulsion machine having the abnormality.

5. The vessel display device according to claim 1, wherein the display information generator generates display information which displays, on the single scale, a range display indicating a range between a maximum value and a minimum value of the same type of information on the plurality of propulsion machines.

6. The vessel display device according to claim 1, wherein the display information generator selects information closest to an abnormal value among the same type of information on the plurality of propulsion machines, and generates display information which displays the selected information on the single scale.

7. The vessel display device according to claim 1, wherein the display information generator generates display information which displays, on the single scale, one or both of a past maximum value and a past minimum value on the same type of information on the plurality of propulsion machines and which displays, on the single scale, one or both of a current maximum value and a current minimum value on the same type of information on the plurality of propulsion machines.

8. The vessel display device according to claim 1, wherein, when the display information generator updates a past value of one or both of a maximum value and a minimum value on the same type of information on the plurality of propulsion machines, the display information generator generates display information including an update display which notifies the update.

9. The vessel display device according to claim 8, wherein, when the past value of one or both of the maximum value and the minimum value on the same type of information on the plurality of propulsion machines is approached, the display information generator generates display information including an approach notification display which notifies the approach.

10. A vessel display device that displays information on a vessel, the vessel display device comprising:
an information acquirer that acquires a same type of information on a plurality of propulsion machines included in the vessel;
a display information generator that generates, based on the information acquired by the information acquirer, display information which displays information on the plurality of propulsion machines on a single scale; and
a display that displays the display information generated by the display information generator; wherein
each of the plurality of propulsion machines includes a prime mover;
the information acquirer acquires prime mover rotation speeds in the plurality of propulsion machines; and
the display information generator divides the prime mover rotation speeds into a plurality of rotation speed regions, records one or both of a maximum value and a minimum value on the same type of information on the plurality of propulsion machines in each rotation speed region and generates display information which displays, on the single scale, one or both of a past maximum value and a past minimum value in the rotation speed region to which a current prime mover rotation speed belongs.

11. The vessel display device according to claim 7, wherein the display information generator generates display information on which past information is not reflected until a predetermined time has elapsed since startup of at least one of the plurality of propulsion machines.

12. The vessel display device according to claim 1, wherein the information acquirer acquires information on each of the plurality of propulsion machines including an engine temperature, an engine rotation speed, a lubricant pressure, a lubricant temperature, a coolant temperature, a coolant pressure, or a battery voltage.

13. A method of displaying information on a vessel, the method comprising the steps of:
acquiring a same type of information on a plurality of propulsion machines each including an engine and being included in the vessel;
generating, based on the same type of information acquired, display information which displays information on the plurality of propulsion machines on a single scale; and
displaying the generated display information on a display.

14. The method according to claim 13, wherein in the step of generating the display information, information closest to an abnormal value among the same type of information on the plurality of propulsion machines is selected, and display information which displays the selected information on the single scale is generated.

15. The method according to claim 13, wherein in the step of generating the display information, display information which displays, on the single scale, one or both of a past maximum value and a past minimum value on the same type of information on the plurality of propulsion machines and which displays, on the single scale, one or both of a current maximum value and a current minimum value on the same type of information on the plurality of propulsion machines is generated.

16. The method according to claim 13, wherein in the step of generating the display information, when a past value of one or both of a maximum value and a minimum value on the same type of information on the plurality of propulsion machines is updated, display information including an update display which notifies the update is generated.

* * * * *